TAPE PERFORATOR FOR TYPE COMPOSING MACHINES

Filed Sept. 4, 1959 3 Sheets-Sheet 1

INVENTORS
VICTOR M. CORRADO
ROBERT J. DONAHUE
BY
Morrison Kennedy Campbell
ATTORNEYS

TAPE PERFORATOR FOR TYPE COMPOSING MACHINES

Filed Sept. 4, 1959

3 Sheets-Sheet 2

INVENTORS
VICTOR M. CORRADO
ROBERT J. DONAHUE
BY
Morrison, Kennedy
Kampfell
ATTORNEYS

TAPE PERFORATOR FOR TYPE COMPOSING MACHINES

Filed Sept. 4, 1959

INVENTORS
VICTOR M. CORRADO
ROBERT J. DONAHUE
BY
Norman Kennedy Campbell
ATTORNEYS

United States Patent Office 3,061,182

Patented Oct. 30, 1962

3,061,182
TAPE PERFORATOR FOR TYPE COMPOSING MACHINES

Victor M. Corrado, Williston Park, and Robert J. Donahue, Brooklyn, N.Y., assignors to Mergenthaler Linotype Company, a corporation of New York Filed Sept. 4, 1959, Ser. No. 838,237
7 Claims. (Cl. 234—5)

This invention relates to a tape perforator for type composing machines and, in particular, to a perforator which is capable of composing text information selectively from a plurality of typographical fonts.

More specifically, the invention relates to a selectively operable character width coding mechanism which in response to key actuation produces a signal of relative width for the particular character selected. The signal thus produced may be coded on a tape that controls operation of a photographic unit to provide the text material on film. In addition, the signal thus produced may be transmitted to a computer apparatus that totalizes the individual character widths in a line of composition and computes the interword spacing for justified lines, or the marginal white space for quadded or centered lines.

In Patent No. 2,848,049, assigned to the assignee of the present invention, there is disclosed a keyboard actuated tape perforator which prepares a coded tape that controls the operation of a photographic unit. Among the components described are the decimal coders. A plurality of these coders are provided, one for each typographical font that can be accommodated in the photographic unit. Each coder is a circuit element which connects the keyboard keys to output leads representative of the relative width values of the characters associated with the various keys. Thus, for example, in one font of a particular type face style the upper case "W" may have a relative width value of eighteen units and the lower case "i" a relative width of four units. Therefore, the decimal coder for that particular font would be adapted to connect the upper case "W" key to an output lead representing eighteen units of width and the lower case "i" key to an output lead representing four units of width. Furthermore, since in a typographical font of a different type face style the upper case "W" may have a relative width of seventeen units and the lower case "i" a width of four units, a different decimal coder would be provided to effect the proper connections between keyboard keys and output leads for the different font. Hence, as noted above, a plurality of decimal coders are provided so that the tape perforator may code signals for a variety of typographical fonts.

The tape perforating apparatus in which the present invention is employed comprises an electric typewriter with a main keyboard carrying the character keys normally used in composing copy and an auxiliary keyboard carrying keys for controlling machine functions, one of which, for example, is to select the typographical font to be used in the photographic unit. Electrical switches operated by the key levers of the main keyboard and the auxiliary keyboard control circuitry which in turn operates the tape coding device and the computer mechanism.

The key operated switch which is closed upon depression of a character key completes a plurality of circuits which may be grouped according to the function performed. A first group of circuits completed will include diode coding circuits which identify the characters in binary form. The binary circuits in turn, through the intermediary of electronic circuitry and tubes, lead to the tape coding device which codes the character identity in a conventional manner.

A second group of circuits energized by depression of a character key will be those which deal with character width information. In the first instance, the circuit will proceed selectively to a decimal coder which represents the width of the character for the key depressed. More specifically, the decimal coder will include a plurality of coding groups or width cards, only one group of which will be in operation at a time. Each group or card represents the width information for the characters of a particular type font, so that only that group will be selected which corresponds with the character font to be used in the photographic unit for the particular text matter being composed. Selection of the coding group is under the control of the operator.

From the decimal coder, the circuit is traced to the unit adding and subtracting circuit where the width value of a character can be modified for reasons of typographical refinement, such as kerning or letterspacing. The circuit thereafter proceeds to the width coder which converts the width information from decimal to binary form. After conversion to binary form, the width information follows two paths, one to the tape coding device where it is coded onto the tape adjacent the character identification signal. The second path followed by the binary width information is to the computing device wherein the widths of the characters and spaces making up the line of composition are totaled so that upon completion of the line, information as to justification, quadding or centering can be obtained as desired. Reference may be had to the aforementioned Patent No. 2,848,049 for a more detailed description of the keyboard actuated tape perforator.

Figures 1, 3, 4:
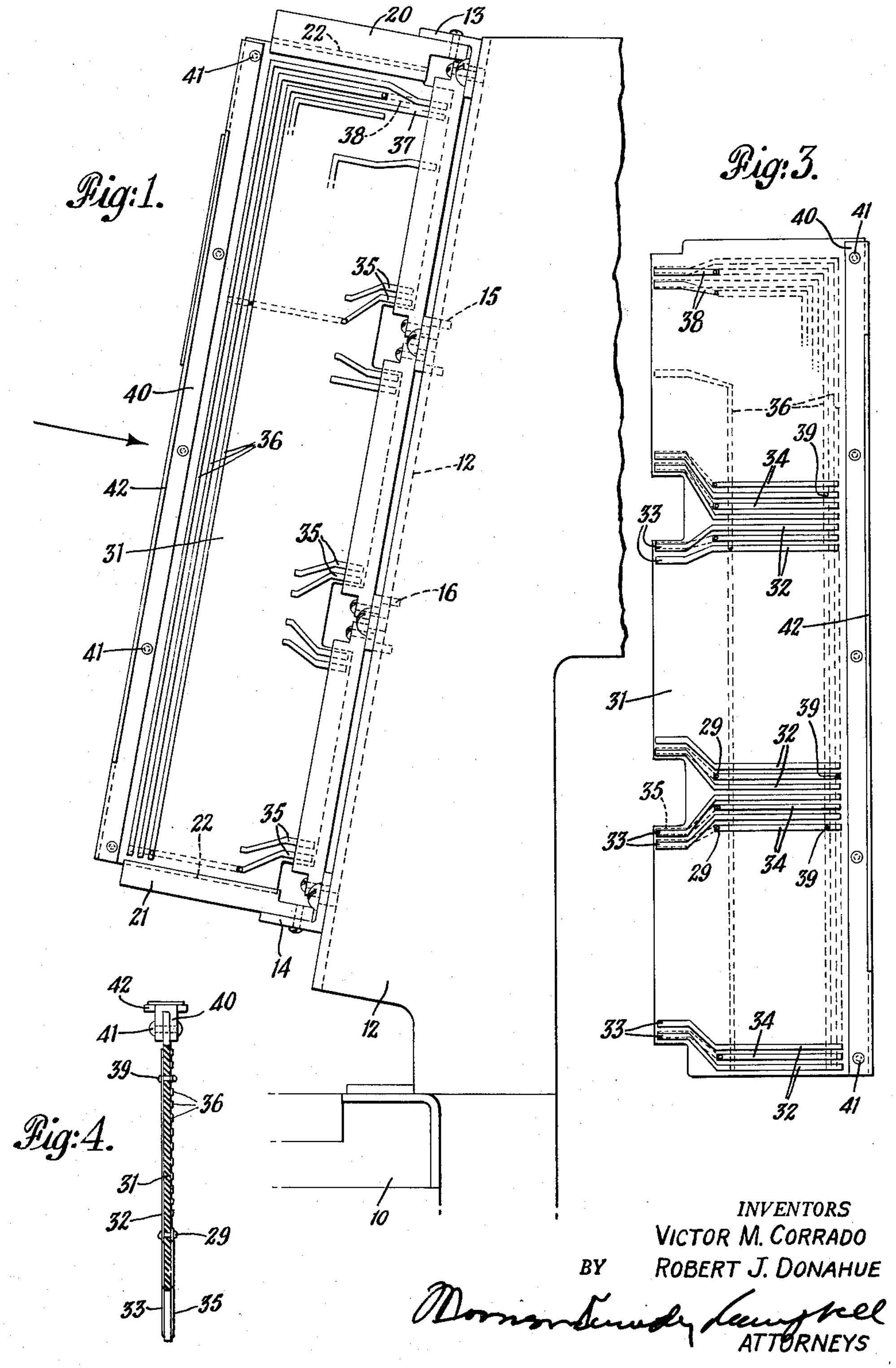
FIG. 1 is a side elevation view showing a width card mounted in a supporting bracket.
FIG. 3 is a side view of a width card.
FIG. 4 is a top view of a width card.
Figure 2:
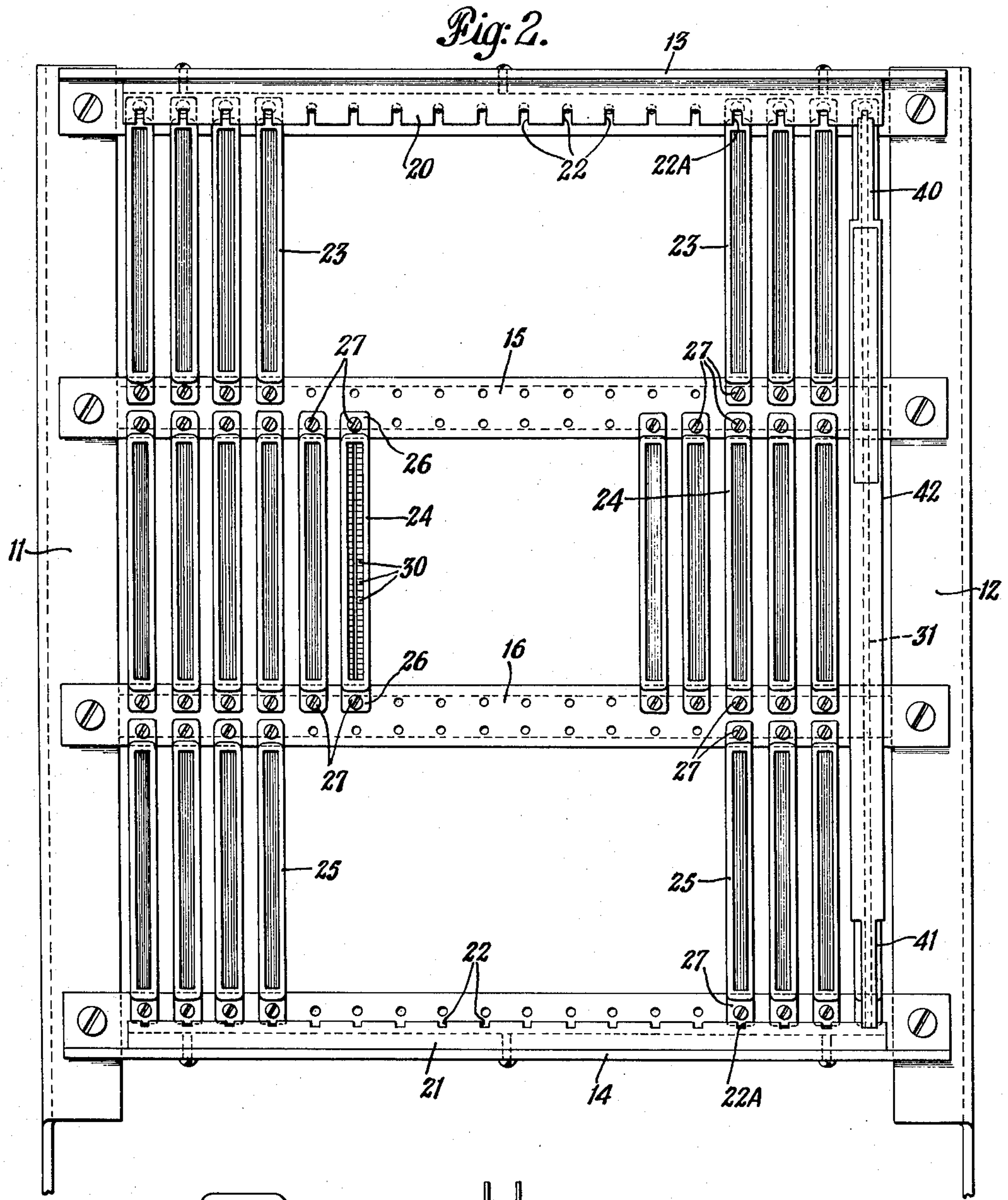
FIG. 2 is a front elevational view showing the supporting bracket for mounting a bank of width cards.
Figure 5:
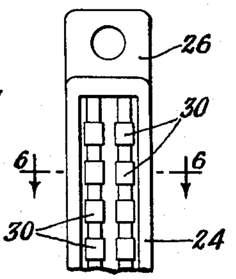
FIG. 5 is a segmental view showing the electrical receptacle into which a width card is plugged.
Figure 6:
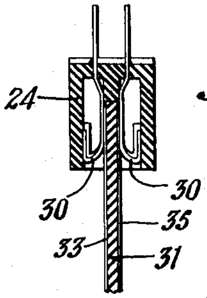
FIG. 6 is a sectional view taken along line 6—6 of FIG. 5 but also showing a fragment of a width card plugged into the receptacle.

In FIG. 1, there is shown an improved decimal coder or width card made according to the present invention. The keyboard apparatus is provided with a base member 10 upon which two spaced apart uprights or standards 11 and 12 are mounted. Between the uprights, and at the tops and bottoms thereof, are two angle iron crosspieces 13 and 14. Intermediate channel sectioned crosspieces 15 and 16 are also provided. The upper crosspiece 13 and the lower crosspiece 14 are provided with guide members 20 and 21, respectively. The guide members are formed of electrical insulating material and are provided with grooves 22 into which the width cards fit. Aligned with a pair of oppositely disposed grooves, e.g., 22A, and mounted between crosspieces 13 and 15, 15 and 16, and 16 and 14, respectively, are three electrical receptacles 23, 24 and 25. The receptacles are trough-like in shape with flanges 26 at both ends which permit their attachment to the crosspieces, as by screws 27. Within the trough shaped receptacles are a plurality of spring-like electrical contactors 30 which make electrical contact with a width card when inserted into operative position in the receptacles.

Attention will now be directed to the physical arrangement of the width card itself. On one side of the base member 31, which is formed of a suitable electrical insulating material, are a plurality of conducting strips 32 and 34, one for each character of the keyboard. It will be noted that alternate strips 32 are electrically connected to contact engaging strips 33 located on the same side of member 31 as strips 32. The remaining alternate strips 34 are electrically connected to contact engaging strips 35 located on the opposite side of member 31, the electrical connection being made through member 31 by means of a rivet 29 or other suitable conductor. The conducting strips 32 and 34 are individually connected electrically to the keyboard keys in a manner later to be described and which is generally described in the above-mentioned patent. As a matter of practice, the upper case characters of a typographical font will be associated with the contact engaging strips on one side of member 31 (e.g. strips 33) while the lower case characters of the font will be associated with the contact engaging strips on the other side of member 31 (e.g. strips 35). The conductor bars 36, which represent decimal width values, are disposed longitudinally with respect to the length of the width cards and are arranged on the side of the card opposite to that on which the conducting strips 32 and 34 are found. Electrical connection between a conducting strip 32 or 34 and its associated decimal bar 36 (which association is dependent on the key with which strip 32 is associated) can be made by a rivet 39. Of course, more than one strip 32 or 34 can be connected to one bar 36 since more than one character may have the same decimal width assigned thereto. It will be noted that one half of bars 36 are connected to contact engaging strips 37 located on one side of member 31 while the remaining bars 36 are connected to contact engaging strips 38 located on the other side of member 31. Again the electrical connection is made through member 31 at the terminal portion of strip 38.

The arrangement of connections is such that when a width card is plugged into operative position, e.g., into electrical contact with receptacles 23, 24 and 25, the electrical circuitry for the keyboard apparatus is completed. See FIG. 1 of Patent No. 2,848,049. By replacing one width card with another one, the decimal width values of the characters of a font can be altered to accord with a new font plate to be used in the photographic machine. No other alteration of the circuit is required since the only variable is in the association of conducting strips 32 and 34 and decimal bars 36. The circuit connection from the keyboard keys and to the remaining circuits are fixedly made to the permanently mounted receptacles.

To give rigidity to the width card and to facilitate its removal from the bank of receptacles, there is provided a backing piece 40 which is secured to member 31 by a plurality of rivets 41. The backing piece is simply a channel shaped section of aluminum having an elongated flange 42 extending along both sides and for almost the entire length of piece 40. In practice, a special tool is provided to grip the backing piece and remove the width card from electrical connection with the receptacles.

Figures 7, 8:
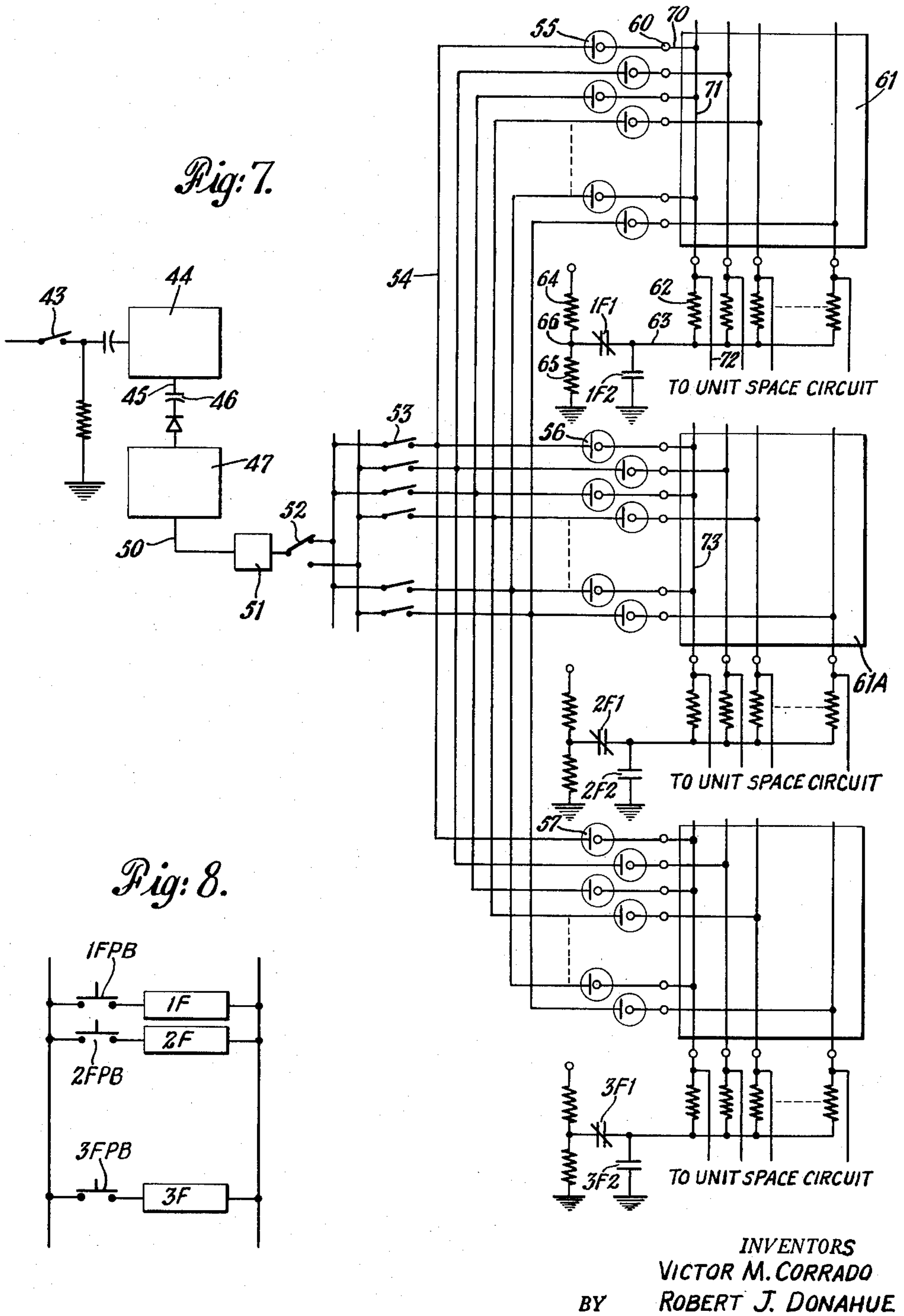
FIG. 7 is a schematic circuit diagram of the width cards and the switching circuits therefor.
FIG. 8 is a schematic circuit diagram of the width card selecting circuits.

Reference is now made to FIG. 7 wherein is shown the electrical circuitry of the keyboard apparatus from the keyboard to the width cards. For a description of the remainder of the circuit, that is, from the width cards to the tape perforator, see copending application Serial No. 785,699, filed January 8, 1959 and assigned to the assignee of the present invention.

When a character key or the space bar of the typewriter is depressed, contacts 43 engage to trigger the "one shot" multivibrator 44 and thereby generate a positive pulse for conduction over lead 45. The capacitor 46 passes only a negative spike to the grid of a second "one shot" multivibrator 47, and it in turn generates a negative pulse which is transmitted over conductor 50 to the grid of a cathode follower 51, causing the tube to conduit. A positive pulse is thereby developed and transmitted to the shift switch 52 and through a character key contact, e.g., 53, to the character identification and width coder circuits and from there to the tape perforator where a character identification signal and a character width signal are produced as described in the aforementioned application. Of course, if the tape is to be used to control operation of a Linotype machine, it could be perforated according to the Teletypesetter code. In such case it is not necessary to code character width. However, the mechanism of the present invention would still be needed since the width information would be utilized to operate a line length indicator for the tape perforator. Moreover, the mechanism disclosed in this specification would be particularly suitable for preparing coded tape to control a Linotype machine of the so-called "mixer type."

The pulse which is transmitted through character key contact 53 is fed through conductor 54 to a plurality of neon glow tubes 55, 56 and 57, each of which is associated with the character key represented by contact 53 and each of which is in circuit with a separate width card representing different fonts of typographical characters. In the circuit shown only three width cards are illustrated, while in actual practice eighteen width cards are in use at one time. Of course, any number of cards may be used depending on the range of flexibility of the apparatus in which they are used.

Each character key contact is connected to a separate common conductor, e.g., 54, which in turn is wired to a neon glow lamp individual to each width card provided. The other "lead in" wire to the tube is connected to the terminal point 60 of a receptacle, e.g., 23. Thus it is seen that all of the connections described may be permanently wired in the apparatus and whatever variable wiring that may be required for various fonts can be achieved by interchanging width cards.

Considering again the pulse transmitted through contact 53, and applied to all neon tubes 55, 56 and 57, it is obvious that the pulse will be transmitted through only one tube so as to code a decimal character width for the character key depressed in the typographical font represented by a selected width card. The selection of a width card is made by depression of a self locking font selection push button, e.g., IFPB (FIG. 8). Depression of this push button results in the energization of the first font relay IF and the consequent engagement of contacts 1F2 and the separation of contacts 1F1.

Prior to the separation of contacts 1F1, the negative sides of the glow lamps associated with width card 61 were connected through resistors 62 to conductor 63 to contacts 1F1 and through the contacts of the voltage divider formed by resistors 64 and 65. The resistors are so valued that the voltage potential existing between junction 66 and contacts 53 is insufficient to cause conduction in the glow lamp 55. However, separation of contacts 1F1 and the engagement of contacts 1F2 results in conductor 63 being grounded, so that when a pulse is transmitted through contacts 53 to conductor 54 the voltage across tube 55 is sufficient to cause the tube to fire and the pulse to be transmitted by conductor 70 (corresponding to a conducting strip 32) and conductor 71 (corresponding to a decimal bar 36) to conductor 72. This latter conductor in turn leads to the unit spacing circuits and the remainder of the keyboard apparatus circuits as described in aforementioned application Serial No. 785,699.

If composition is to take place from a different font, then a different font push button, e.g. 2FPB, is depressed to energize relay coil 2F. Depressing of push button 2FPB will reset the previously depressed push button, e.g., 1FPB, by mechanical means not described but fully known in the art. Of course, electrical means to cause the deenergization of coil 1F might be employed instead of the mechanical resetting means for push button 1FPB, the important point being that only one circuit is energized at a time. Energization of relay 2F results in the separation of contacts 2F1 and the engagement of contacts 2F2. This results in the activation of width card 61A rather than width card 61, so that subsequent engagement of contacts 53 and energization of conductor 54 causes conduction in neon glow lamp 56 and the transmission of width information through conductor 73 to the unit spacing circuits as before.

By a similar action any one of a plurality of width cards representing a plurality of fonts of type characters can be selected for operative cooperation with the keyboard and circuitry of the apparatus.

It is contemplated that many changes may be made in the preferred embodiment of this invention as above described without departing from the spirit and scope thereof, and therefore it is intended that all matter contained in the above description or shown in the accompanying drawings shall be interpreted as illustrative and not in a limiting sense.

What is claimed is:

1. A tape perforator for composing type characters that vary in set widths on a units-of-an-em basis and equipped with a plurality of width card elements connecting the keyboard to circuitry responsive to the width value of a character represented by a depressed key, each of said width card elements representing a particular assignment of width values to the characters of the keyboard according to a given typographical font and each width card comprising a plurality of electrical conductors, one for each character of the keyboard and a plurality of conducting bars, one for each unit width value assigned to the keyboard characters, only a single width card being operatively connected in said machine at one time, a plurality of groups of neon lamps, one group for each character width card, there being as many lamps as there are electrical conductors on all of the character width cards, a plurality of voltage divider circuits, one for each different character width card, and means for conditioning any selected one of the divider circuits so that only the neon lamps associated with the corresponding character width card will conduct in response to key actuation.

2. A tape perforator according to claim 1, including a resistor connecting each conducting bar of a width card to a common junction, normally open contacts connecting said junction to ground, normally closed contacts connecting said junction to a voltage higher than ground, said normally open and said normally closed contacts being simultaneously actuated by said selecting means whereby the closing of said normally open contacts causes a greater voltage differential to be applied to the associated neon lamps of said width card upon actuation of the keyboard than that applied to the neon lamps associated with the other width cards.

3. A tape perfortor according to claim 1, wherein the said conditioning means comprise a pair of contacts, one pair for each divider circuit, one of said pair of contacts being normally closed and the other of said pair of contacts being normally open, and a font selector for opening the normally closed pair of contacts and closing the normaly open pair of contacts in selecting a divider circuit for the desired character width card.

4. A keyboard operated tape perforator for composing type characters that vary in set width on a units-of-an-em basis comprising, in combination, a plurality of width card elements, each representing a particular assignment of width value to the characters of the keyboard according to a given typographical font and each comprising an electrical insulating board, a plurality of electrical conductors mounted on said board, one for each character of the keyboard, and a plurality of electrical conducting bars also mounted on said board, one for each possible unit width assigned to the keyboard characters, and means for connecting each electrical conductor to a conducting bar having an assigned width value corresponding to that of the character associated with said electrical conductor, a stationary holder in which the width card elements are mounted, input circuitry responsive to keyboard operation and connected to the electrical conductors of all of the width card elements, a font selector for activating any desired one of the width card elements to the exclusion of the others, and output circuitry connected to the electrical conducting bars of all of the width card elements and governing the operation of mechanism subject to keyboard control according to the width card element activated.

5. A combination according to claim 4, wherein the stationary holder is formed with a plurality of separate compartments, one for each width card element, and wherein said width card elements are mounted in their respective compartments for individual removal and replacement by other width card elements representing different assignments of character width values.

6. A combination according to claim 5, wherein the compartments of the stationary holder are formed of electrical insulating material and are provided with a set of electrical contactors forming part of the input circuitry and making contact with the electrical conductors of the width card elements and with another set of electrical contactors forming part of the output circuitry and which make contact with the electrical conducting bars of the width card elements.

7. A combination according to claim 4, wherein the electrical conductors are located on one side of the electrical insulating board while the electrical conducting bars are located on the opposite side of said board, and wherein the means for connecting the conductors and conducting bars are in the form of electrical connections passing through the insulating board.

References Cited in the file of this patent

UNITED STATES PATENTS

| | | |
|---|---|---|
| 2,487,373 | Reppert | Nov. 8, 1949 |
| 2,746,680 | Maul | May 22, 1956 |
| 2,848,049 | Robbins et al. | Aug. 19, 1958 |

OTHER REFERENCES

IBM Technical Disclosure Bulletin, vol. 2, No. 2, August 1959, pages 30, 31.

Notice of Adverse Decision in Interference

In Interference No. 95,875 involving Patent No. 3,061,182, V. M. Corrado and R. J. Donahue, TAPE PERFORATOR FOR TYPE COMPOSING MACHINES, final judgment adverse to the patentee was rendered May 24, 1968, as to claims 4, 5, 6 and 7.

[*Official Gazette August 20, 1968.*]